United States Patent [19]

Sanders

[11] Patent Number: 4,613,781

[45] Date of Patent: Sep. 23, 1986

[54] END CAP ASSEMBLY AND BRUSH BOX AN ELECTRIC MOTOR

[75] Inventor: Anthony J. Sanders, Darlington, England

[73] Assignee: Black & Decker Inc., Newark, Del.

[21] Appl. No.: 648,534

[22] Filed: Sep. 7, 1984

[30] Foreign Application Priority Data

Sep. 9, 1983 [GB] United Kingdom ................ 8324263
Jun. 22, 1984 [GB] United Kingdom ................ 8415951

[51] Int. Cl.⁴ ...................... H02K 15/00; H02K 13/10
[52] U.S. Cl. ..................................... 310/239; 310/50; 310/71
[58] Field of Search ..................... 24/90 HA, 602, 621; 310/42, 43, 47, 50, 71, 238, 239, 242, 246, 245, 247; 29/509, 597

[56] References Cited

U.S. PATENT DOCUMENTS

| 3,482,135 | 12/1969 | Hurlin | 310/239 |
|---|---|---|---|
| 3,568,266 | 3/1971 | Uhrig | 310/239 |
| 3,656,018 | 4/1972 | Maher | 310/247 |
| 3,924,147 | 12/1975 | Tarnow et al. | |
| 4,074,162 | 2/1978 | Parzych | 310/245 |
| 4,266,155 | 5/1981 | Niemela | 310/239 |
| 4,293,789 | 10/1981 | King | 310/239 |
| 4,355,253 | 10/1982 | Vollbrecht | 310/239 |
| 4,420,702 | 12/1983 | Mixner | 310/42 |
| 4,494,029 | 1/1985 | Hoshino et al. | 310/239 |
| 4,523,116 | 6/1985 | Dibbern, Jr. et al. | 310/50 |

FOREIGN PATENT DOCUMENTS

| 1763023 | 7/1971 | Fed. Rep. of Germany . | |
|---|---|---|---|
| 2631431 | 1/1978 | Fed. Rep. of Germany . | |
| 2745109 | 4/1979 | Fed. Rep. of Germany . | |
| 2819352 | 11/1979 | Fed. Rep. of Germany . | |
| 2814782 | 6/1981 | Fed. Rep. of Germany . | |
| 3147418 | 6/1983 | Fed. Rep. of Germany . | |
| 648055 | 12/1928 | France . | |
| 2339265 | 8/1977 | France . | |
| 2437723 | 4/1980 | France . | |
| 1151636 | 5/1969 | United Kingdom . | |
| 2044552 | 10/1980 | United Kingdom | 310/239 |
| 2110883 | 6/1983 | United Kingdom | 310/242 |
| 2113924 | 8/1983 | United Kingdom | 310/239 |

Primary Examiner—Patrick R. Salce
Assistant Examiner—D. L. Rebsch
Attorney, Agent, or Firm—Ronald B. Sherer; Edward D. Murphy; Harold Weinstein

[57] ABSTRACT

A stator assembly of an electric motor includes a lamination stack, a field coil, an end cap having a plastics body fixed to the lamination stack, a brush box made of electrically conducting material, mounted on the plastics body, housing brushes resiliently biased towards the axis of the assembly, and a plurality of electrical conductors in the form of strips of predetermined configuration located on the plastics body for making electrical connections between components of the motor. The electrical conductors include a first conductor extending from the brush box; a second conductor extending from a termination of the field coil and a conducting means, which incorporates an inductance, connects the first and second conductors. The inductance in the connection is altered by altering the inductance of the conducting means. The first conductor is wrapped around the brush box to give a good and reliable electrical connection. The end wall of the brush box is connected by a tongue that can be flexed repeatedly to allow brush replacement without the end wall's breaking off. An impedance, typically a capacitor, that is connected across the power supply of the motor, is clamped on the end cap by a plastics clamping arm.

11 Claims, 30 Drawing Figures

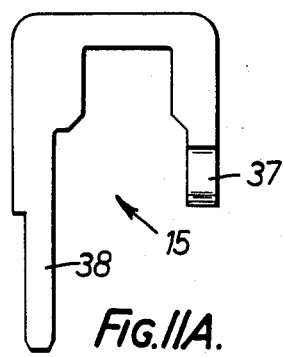 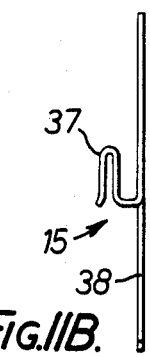
FIG.11A.  FIG.11B.
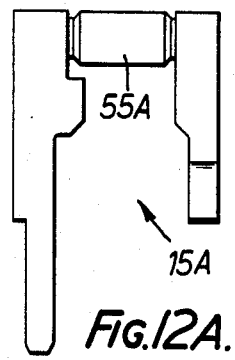 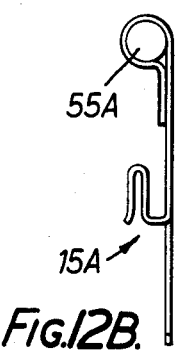
FIG.12A.  FIG.12B.
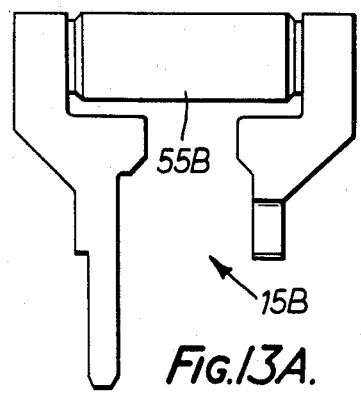 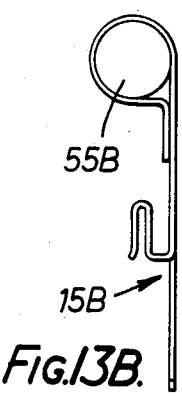
FIG.13A.  FIG.13B.

END CAP ASSEMBLY AND BRUSH BOX AN ELECTRIC MOTOR

FIELD OF THE INVENTION

This invention relates to electric motors, the design of certain components for such motors, tools incorporating such motors and to methods of manufacturing such devices.

BACKGROUND OF THE INVENTION

The design of small electric motors such as may be used in power tools receives a very great amount of attention. In particular attempts are made to facilitate assembly processes that are carried out in the factor and to facilitate subsequent maintenance of the motor. The most common maintenance operation is that of brush replacement.

In order to facilitate the assembly of a motor it is desirable to automate the assembly process so far as possible. While parts of the process are relatively easy to automate other parts are not.

A factor that influences the ease of assembly of an electric motor is the number of electrical connections that have to be made during assembly and the ease with which these connections can be made. It is known to use strip conductors that have sufficient stiffness that they return their shape during normal use and this greatly facilitates their connection during motor assembly. Sometimes the same basic electric motor may be used in a variety of devices and, according to its use, impedances are connected in series or in parallel with a part of the motor circuit; in such cases it has not previously been possible to provide a satisfactory arrangement employing stiff conductors yet also allowing for connection of these impedances when approporiate.

In order to simplify assembly of products incorporating electric motors, it is known to provide a motor unit which can be installed in a tool as a single module. This also allows for the whole motor to be replaced readily in the event that a component of the motor fails; while such an operation can be relatively simple, it provides a rather drastic solution to the common problem of, for example, a simple brush wearing out. It is also known to provide a modular motor of this kind which can readily be dissembled into component parts comprising an armature, a stator assembly and a pair of end caps on opposite ends of the stator assembly, the end cap at the commutator end of the motor carrying strip connectors and brush boxes which in the assembled tool make the appropriate electrical connections with the brushes and field coils. In this known design the armature has to be located in position before the brush boxes and brushes are installed since otherwise the brushes in the brush boxes would interfere with insertion of the armature. Thus in assembling this motor the end caps and stator assembly are secured together with the armature in position before the brush boxes and brushes are installed; the brush boxes and brushes have to be installed as a separate operation at the end.

It is of course important that the electrical connections between the components of a motor are reliable and able to withstand the vibration to which they are inevitably exposed in use. In a conventional arrangement for making an electrical connection to a brush holder, the brush holder is provided with a tag over which a lead is clipped. Unless special precautions are taken, it is possible for the lead to become detached from the tag.

With regard to brush replacement, a known method which avoids the need to remove the brush box involves bending open the rear end of the brush box to gain access to the brush and spring. While this arrangement will work once or twice, repeated bending of the rear end of the brush box leads eventually to the end breaking off. One solution to this problem that has been proposed is to make the rear end of the brush box replaceable, but of course this complicates the design of the brush box.

A further difficulty encountered by designers of electric motor relates to the location of the impedance (capacitor) that is commonly connected across the power supply leads to the motor. In many respects it is convenient to mount the impedance on the motor itself but as this part vibrates during operation of the motor, there is a risk of the electrical connections to the impedance breaking.

SUMMARY OF THE INVENTION

According to a first aspect of the invention there is provided a stator assembly of an electric motor, the stator assembly including a lamination stack, a field coil, an end cap having a plastics body fixed to the lamination stack, a brush box made of electrically conducting material, mounted on the plastics body, and housing brushes resiliently biased in the direction towards the motor axis for making contact with a rotor of the motor, and a plurality of electrical conductors in the form of strips of predetermined configuration located on the plastics body for making electrical connections between components of the motor, the electrical conductors including a first conductor extending from the brush box, a second conductor extending from a termination of the field coil, there being conducting means electrically connecting the first and second conductors.

The conducting means may be an electrically conducting member such as a wire or it may incorporate an electrical impedance which may be an inductance. With such an arrangement it is a simple matter to alter the impedance connected between the first and second conductors.

In one method of assembly embodying the invention the first and second conductors are first installed and the conducting means is subsequently electrically connected.

In one embodiment of the invention the stator assembly includes a pair of field coils and a pair of brush boxes and the plurality of electrical conductors further includes a pair of conductors extending from respective field coil terminations and provide respective connection facilities to enable the stator assembly to be connected to an electrical supply.

The plurality of electrical conductors may be located in slots in the end cap.

The stator assembly complete with brush, brush boxes, and electrical conductors connecting the brushes and field coils together with any impedances to terminals for connection to a power supply can therefore be designed to be manufactured as a subassembly and can be transported and stored as desired.

According to another aspect of the invention there is provided an end cap assembly for mounting on a lamination stack of an electric motor including a plastics body, a pair of brush boxes made of electrically conducting material, mounted on the plastics body and housing brushes resiliently biased in a direction towards the motor axis for making contact with a rotor of the motor, the brush boxes including releasable fastenings for retaining the brushes in a retracted position in the brush boxes, and a plurality of electrical conductors in the form of strips of predetermined configuration located in the plastics body for making electrical connections between components of the motor, each of the brush boxes making contact with a respective electrical conductor.

The end cap assembly complete with brushes and brush boxes can therefore be designed to be manufactured as a sub-assembly with the brushes retracted. When the end cap assembly and rotor are brought into their correct relative positions, the fastenings can be released completing the installation of the brushes. The end cap assembly may be formed as a separate sub-assembly or may be mounted on a lamination stack and form part of a stator assembly.

The fastenings may be provided by parts of the brush boxes. Each part may be formed by a portion of a wall of the brush box which is partly disconnected from the rest of the wall.

Each electrical conductor making contact with a brush box may be configured to wrap around the base of the brush box. The base of each brush box may have lateral flanges around which the respective electrical conductor is configured to wrap. The lateral flanges may be formed as lateral extensions of the base of the brush box and the conductor may pass underneath and directly adjacent to the base of the brush box. The arrangement of each brush box and the respective conductor is preferably such that the respective electrical conductor cannot be moved out of engagement with the brush box without moving the brush box. This arrangement of connecting the brush box to the electrical conductor is able to provide a very sound electrical connection automatically upon mechanical engagement of the components and, in the preferred form, the electrical connection cannot be broken without the brush box first being removed. Preferably the brush box is permanently fixed to the plastics body.

Preferably, each brush box is made of sheet material and includes side walls, an end wall, and an opening opposite the end wall and the end wall is connected to one of the side walls by a tongue of sheet material and can be moved from a closed position in which it obstructs the associated end of the brush box to an open position in which the obstruction is substantially removed to enable a brush to be inserted or removed, movement of the end wall being accompanied by deformation of the tongue.

The tongue provides a substantial length along which deformation can take place and thus the bending strain at any one location is reduced so that the end wall can be moved repeatedly between the open and closed positions without danger of it breaking off.

The tongue preferably has a length of at least one sixth of the length of the brush box.

The tongue may be formed from a part of the side wall to which the end wall is joined.

Preferably the end cap assembly further includes an electrical impedance mounted on the plastics body and to which electrical connection is made, wherein the plastics body includes a resilient plastics clamping arm which is resiliently deformed by the electrical impedance and which bears against the impedance clamping it to the body.

Such an arrangement provides a very simple but reliable and effective way to secure the impedance on the end cap assembly.

In a typical case the impedance may be a capacitor connected across the power supply to the electric motor.

The clamping arm may have a distal end on which a clamping head is formed, the clamping head having a protuberance for engaging the impedance. The protuberance may have an inclined cam face for engaging the impedance during its installation whereby its clamping arm is resiliently deformed during its installation. The protuberance may have a face disposed at an acute angle to the longitudinal axis of the arm, which face bears against the impedance clamping it to the body.

The invention also provides an electric motor including a stator assembly as defined above or an end cap assembly as defined above. The invention further provides an electric tool, which may be a hedge trimmer incorporating such an electric motor.

According to another aspect of the invention there is provided a component of an electric motor, the component including a plastics body, at least one brush box made of electrically conducting material mounted on the plastics body and having brushes for making contact with a rotor of the motor, and an electrical conductor to which the brush box is connected, wherein the brush box includes a base formed with lateral flanges and the electrical conductor has a predetermined shape configured to wrap around the flanges of the brush box.

According to another aspect of the invention there is provided a component of an electric motor, the component including a plastics body, at least one brush box made of electrically conducting material mounted on the plastics body and housing a brush for making contact with a rotor of the motor, and an electrical conductor to which the brush box is connected, wherein the electrical conductor making contact with the brush box is configured to wrap around the base of the brush box in such a way that the conductor cannot be moved out of engagement with the brush box without moving the brush box.

According to yet another aspect of the invention there is provided a method of assembling a component of an electric motor comprising a plastics body, at least one brush box made of electrically conducting material for housing a brush for making contact with a rotor of the motor, and an electrical conductor for making electrical connection to the brush box, wherein the electrical conductor is first located in position on the plastics body and thereafter the brush box is located on the body in contact with the conductor.

According to yet another aspect of the invention there is provided a brush box made of sheet material and including side walls, an end wall and an opening opposite the end wall, wherein the end wall is connected to one of the side walls by a tongue of sheet material and the end wall can be moved from a closed position in which it obstructs the associated end of the brush box to an open position in which the obstruction is substantially removed to enable a brush to be inserted or removed, movement of the end wall being accompanied by deformation of the tongue.

According to a still further aspect of the invention there is provided an end cap assembly for an electric motor, the end cap assembly including a plastics body and an electrical impedance which is mounted on the plastics body and to which electrical connection is made, wherein the plastics body includes a resilient plastics clamping arm which is resiliently deformed by the electrical impedance and which bears against the impedance, clamping it to the body.

BRIEF DESCRIPTION OF THE DRAWINGS

By way of example certain embodiments of the invention will now be described with reference to the accompanying drawings, in which:

FIGS. 11A, 12A and 13A show plan views of different forms of electrical connectors that may be employed in the end cap assembly, FIGS. 11B, 12B and 13B show side views of the connectors of FIGS. 11A, 12A and 13A respectively.

DETAILED DESCRIPTION OF THE PREFERRED EMBODIMENTS

Figure 1:
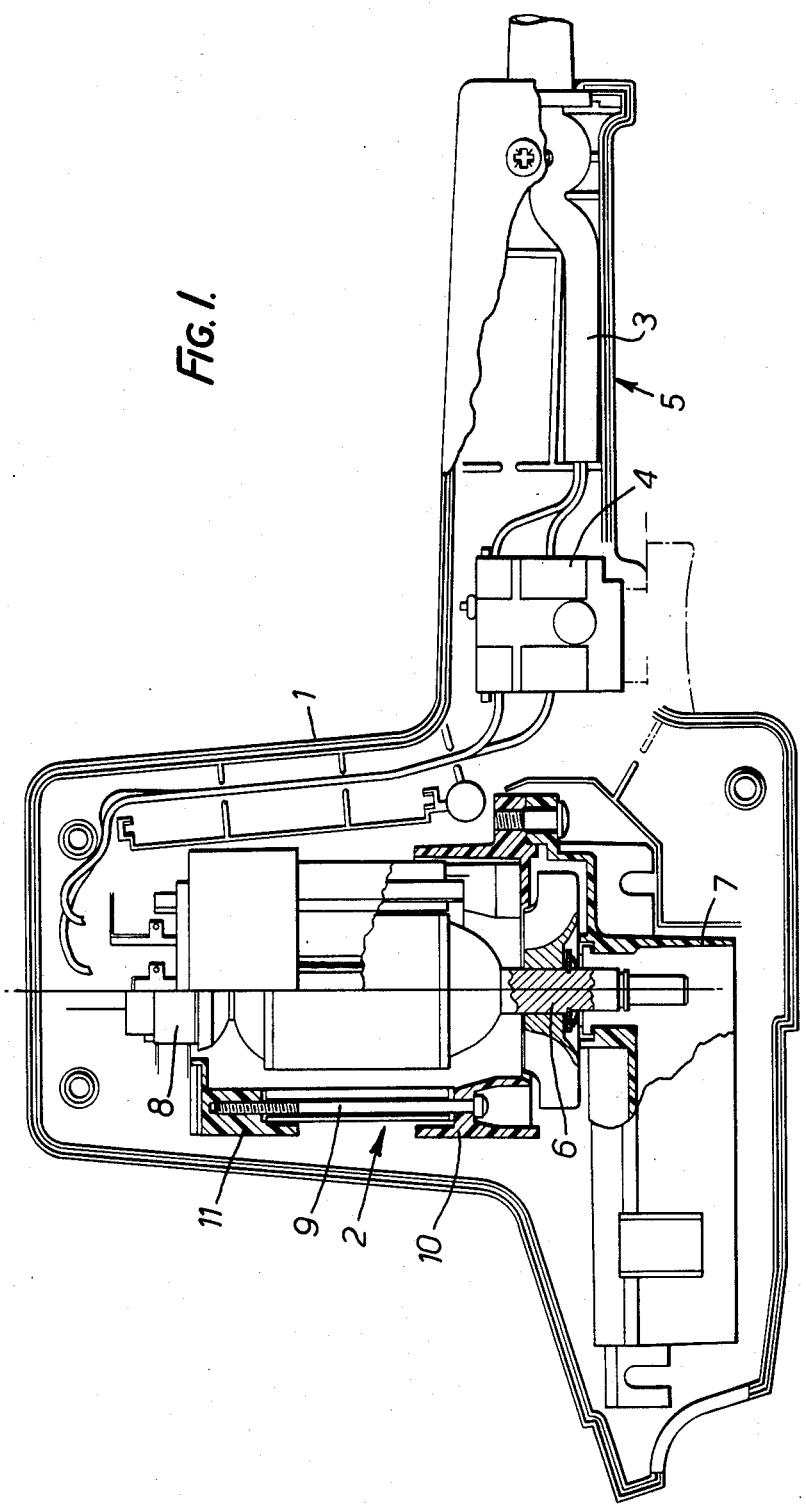
FIG. 1 is a sectional side view of a motor mounted in the body of a hedge trimmer.
Figure 2:
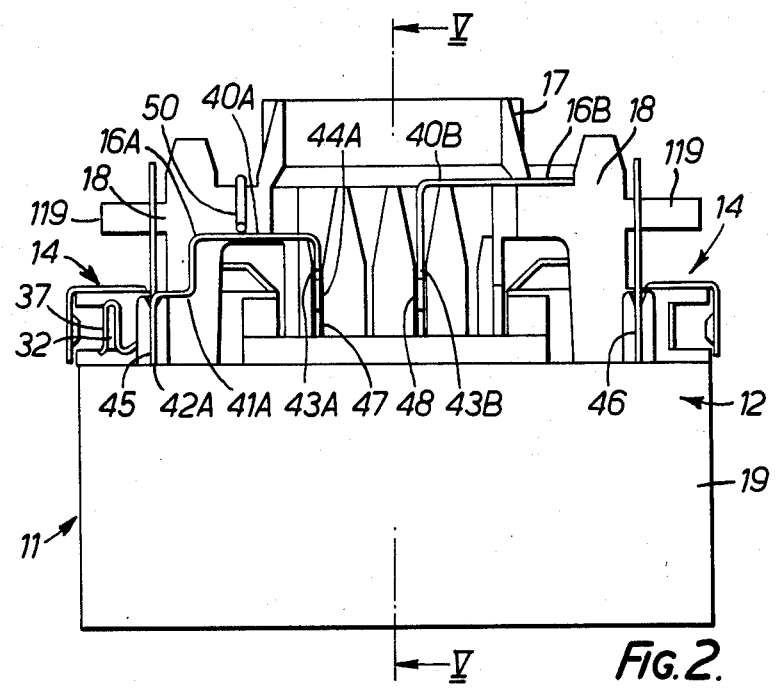
FIG. 2 is a side view of an end cap assembly at the commutator end of the motor.

Referring first to FIG. 1, a hedge trimmer has an outer casing 1 of clam shell construction, a motor 2 connectible to a power supply by a cable 3 via a switch 4 in a handle 5. The motor has an armature shaft 6 which drives the blades (not shown) of the trimmer via gears (not shown) mounted in a gearbox housing 7.

The motor 2 has an armature on the armature shaft 6, a commutator 8, a stator assembly 9, an end cap 10 at the gearbox end and an end cap assembly 11 at the commutator end. The end cap 10, end cap assembly 11 and stator assembly 9 are bolted together and the end cap 10 and the gearbox housing 7 are also bolted together. The armature shaft is mounted for rotation at one end in a bearing of the end cap assembly 11 and at the other end in a bearing in the gearbox housing 7.

The present invention is concerned with the structure of the motor 2 and more particularly of the end cap assembly 11 and it should be understood that the invention may find a wide variety of applications in any case where an electric motor is to be employed. The description below is therefore concerned primarily with details of the motor 2 and in particular of the end cap assembly 11.

Figure 7:
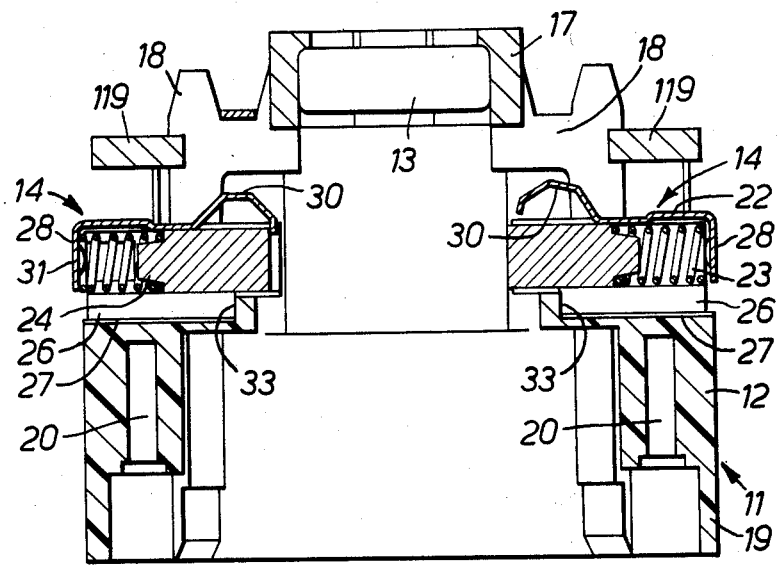
FIG. 7 is a sectional view along the lines VII—VII of FIG. 6 of the end cap assembly.

Referring now also to FIGS. 2 to 10, the end cap assembly 11 comprises a plastics body 12, a bearing 13 (omitted for the sake of clarity from some views but shown in FIG. 7) in which the motor armature shaft is mounted, a pair of brush boxes 14 housing brushes (not shown in some views but shown in FIG. 7), a pair of strip connectors 15 for making electrical connection between the brush boxes 14 and ends of the field coils of the motor 2, and a pair of strip connectors 16A and 16B for making electrical connection between a power supply and ends of the field coils. The strip connectors are relatively stiff members and therefore retain their shape during normal use.

The plastics body 12 is made in one piece and includes an annular end portion 17 in which the bearing 13 is mounted. This bearing incorporates a heat sink, and the heat sink may be perforated to allow a flow of cooling air therethrough. The end portion 17 is connected by legs 18 to a generally cylindrical cap part 19. Between the end portion 17 and the cap part 19 a pair of diametrically opposite brush box mountings are provided.

A respective pair of legs 18 is associated with each brush holder mounting and the legs of a pair are interconnected by a transverse integral bridge 119.

Figure 5:
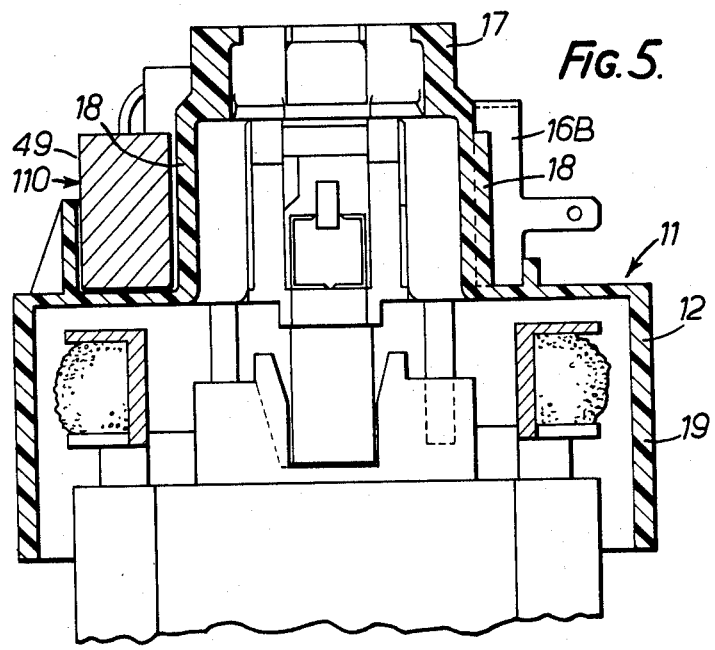
FIG. 5 is a sectional view along the lines V—V of FIG. 2 of the end cap assembly mounted on the stator assembly, the armature also being shown.
Figure 6:
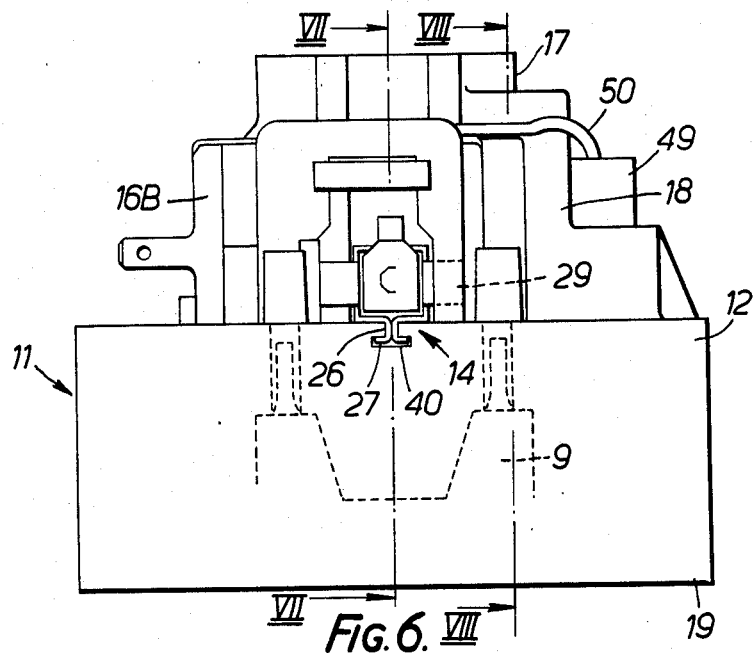
FIG. 6 is a view in the direction of the arrow VI in FIG. 3 of the end cap assembly.

As shown most clearly in FIGS. 5 and 7, the cap part 19 fits around the end of the stator assembly 9 and has a screw threaded bores 20 by which it is bolted to the stator assembly and the end cap 10.

Figure 9:
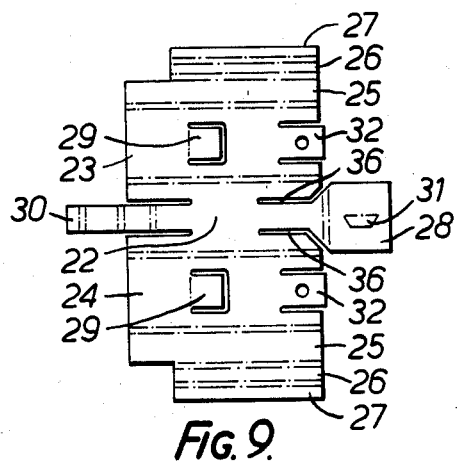
FIG. 9 shows a blank of a brush box of the end cap assembly.

The brush boxes 14 are made by folding sheet metal blanks which are of the form shown in FIG. 9. Referring in particular to FIGS. 7 and 9 each box has a top wall 22, side walls 23 and 24, an end wall 28 with an integral projection 31, a slotted base made up of portions 25 of the blank, legs 26 and feet 27 which extend outwardly from the legs 26.

Each side wall of the brush box has a wing 29 which during manufacture of the box is bent through a small angle so that it projects outwardly from the box. In addition a terminal 32 is formed on each side wall by bending a portion of the wall out to a position substantially perpendicular to the wall.

During manufacture the brush box is first bent into the shape of the right hand brush box shown in FIG. 7. It will be seen that the top wall includes an extension 30 which is flat when formed in the blank of FIG. 9 but which is bent into a hook shape above the hollow interior of the box. At this stage a brush and metal spring is inserted into the brush box through the open end opposite the end wall 28 with the spring between the brush and wall 28. The brush is then pushed into the box against the bias of the spring until the brush is entirely within the box. The hooked extension 30 is then bent down to the position shown on the left hand side of FIG. 7 in which position it acts as a fastening and retains the brush entirely within the brush box.

Figure 10:
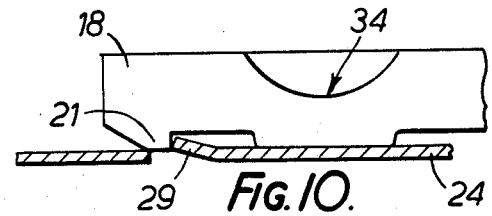
FIG. 10 shows the method of locating the brush box on the end cap assembly.

The brush box and brush assembly is then installed on the body 12 as will now be described with reference to FIGS. 2, 6, 7 and 10. The brush boxes are each pushed into position in a direction perpendicular to and directly towards the motor axis. The feet 27 of each brush box are slid along a groove 40 in the cap part 19 between the legs 18. The legs 18 carry retaining hooks 21 (FIG. 10) on those parts of the legs adjacent the brush boxes and, as the feet 27 reach the limit of their inward movement and come into contact with a flange 33 at the end of the groove 40, the wings 29 pass the hooks 21 and spring into their unstressed condition shown in FIG. 10 preventing reverse embodiment of the brush box. As shown in FIG. 10 a portion of the legs 18 in engagement with the brush box side walls 23, 24 are locally deformed in the area indicated by reference numeral 34, either ultrasonically or by staking, into contact with the brush boxes.

Once the cap assembly has been installed as part of the motor 2 with the armature in place, the hooked extensions 30 are bent up into the position shown on the right hand side of FIG. 7 allowing the brushes to move out from the brush boxes under their spring bias into contact with the commutator.

In the event that a brush has to be replaced the end wall 28 of the brush box is bent upwards. It has been found in the past that repeated bending of the end wall leads to its breaking off at the juncture with the top wall 22. In the embodiment described, slots 36 are provided in the top wall extending from its junction with the wall 28 so that a tongue is defined along a part of the top wall and bending of the end wall relative to the top wall can be accommodated over a much greater length by deformation of this tongue resulting in lower bending strains and improving the resistance of the box to repeated replacement of brushes. In the example described, the tongue extends along about a quarter of the length of the top wall 22.

Electrical connection to each of the brush boxes 14 is made by a respective strip connector 15 shown in FIGS. 11A and 11B. The connector 15 is generally "U" shaped with limbs of unequal length. The short limb terminates in a hook portion 37 and the longer limb terminates in a spade terminal 38. The connector 15 is simply pressed into position on the end cap assembly 11 by introducing it parallel to the motor axis from the outside: the spade terminal 38 is inserted through the appropriate one of a pair of rectangular slots 39 (FIG. 3) in the plastics body 12 and the hook portions 37 are pressed over the appropriate one of the pair of terminals 32 on each brush box. Once in position, the connectors 15 are held in place by virtue of their engagement with the terminals 32 and their location in the slots 39, and in this position the spade terminals 38 project into the hollow interior of the cap part 19.

The other pair of strip connectors, which are for connecting a power supply to the ends of field coils of the stator assembly 9, are of slightly different configurations and are referenced as 16A and 16B in the drawings. Each connector 16A, 16B is of generally 'U' shaped configuration. Referring to FIGS. 2, 3, 5, 6, 7 and 8 the connector 16A has a base part 40A, a cranked limb 41A whch defines a spade terminal 42A at its distal end and another limb 43A on which an integral terminal 44A is provided. The other connector 16B has a base part 40B, a straight limb 41B which defines a spade terminal 42B (FIG. 8) at its distal end and another limb 43B on which integral terminal 44B is provided. The connectors 16A, 16B are simply pressed into position on the end cap assembly 11 by introducing them parallel to the motor axis from the outside: the spade terminals 42A, 42B are inserted through respective rectangular slots 45, 46 in the plastics body 12 and the limbs 43A and 43B are inserted into respective grooves 47 and 48 in the body 12. Once in position, the connectors 16A and 16B are held in place by virtue of their engagement in the slots 45, 46 and the grooves 47, 48, and in this position the terminals 42A, 42B project into the hollow interior of the cap part 19. A capacitor 49 (FIGS. 3, 5 and 6) is shown electrically connected, for example by soldering or spot welding of leads 50 between the base parts 40A and 40B of the connector strips and located in a recess in the body 12. As will become clear from the description below, this capacitor may be omitted if any necessary capacitance is provided in the power supply to the motor 12.

When the end cap assembly 11 is to be secured to the stator assembly 9 and the end cap 10, the end cap assembly 11 is offered up to the stator assembly 9 with the cylindrical part 19 overlapping the end of the stator assembly. Four projections 52 (FIG. 4) around the interior of the cylindrical part 19 guide the end cap assembly as it engages over the stator assembly.

Figure 8:
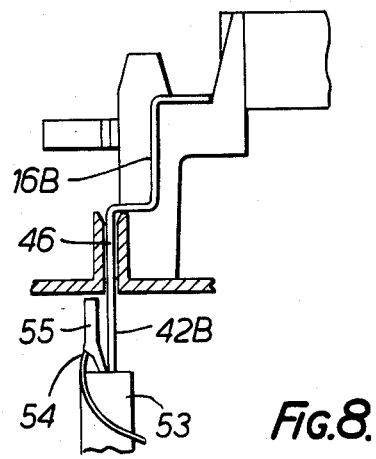
FIG. 8 is a sectional view along the lines VIII—VIII of FIG. 6 of a part of the end cap assembly, also showing a part of the stator assembly.

The end cap 10 is similarly offered up to the stator assembly 9 and these three parts bolted together to form what will be referred to as a stator unit. The connectors 15, 16A and 16B are then installed in the stator unit. Each of the spade terminals 38, 42A and 42B engages in a respective terminal recess on the stator assembly; FIG. 8 shows the spade terminal 42B engaging in a terminal recess 53 on the stator assembly and also shows an end 54 of a field coil terminated in the recess by a terminal 55. The construction of such terminations on a stator assembly is known to those skilled in the art and will not be described in further detail here. It will be appreciated that the spade terminals 38 and 42A are connected to the stator assembly 9 in the same way as the terminal 42B. Electrical connection to the stator unit is made by leads extending from the switch 4 to the terminals 44A and 44B. Within the stator unit the terminal 44A is connected via the connector 16 through one field coil to one brush and the terminal 44B is connected via the connector 16 through the other field coil to the other brush.

The stator unit, including the brush holders 14 with brushes and springs retained therein, the strip connectors 15 and the strip connectors 16A and 16B, forms a unit that can be handled as such during manufacture without coming apart. The ability of the unit once assembled to be stored and transported alone considerably facilitates manufacture of the motor as a whole.

The various components that are secured to the plastics body 12 are all secured simply by offering them to the body in a direction parallel to the motor axis (in the case of the connectors 15, 16A and 16B) or along a single line perpendicular to the motor axis (in the case of the brush boxes 14). This makes the cap assembly very suitable for assembly by automated machinery.

After the armature has been installed in the stator unit, the hooked extensions 30 are retracted to release the brushes as already described.

While a specific embodiment of the invention has been described it will be appreciated that many modifications may be made to the embodiment described above and some of these will now be mentioned.

As an alternative to providing the connectors 15 shown in FIGS. 11A and 11B, it may be desirable to provide connectors 15A as shown in FIGS. 12A and 12B or connectors 15B as shown in FIG. 13A and 13B. In these alternative constructions a series connected inductor 55A or 55B is provided as an integral part of the connector. The ends of the inductor are securely fixed to the adjoining ends of the connector, so that for assembly purposes the connectors 15A and 15B can be treated in just the same way as the connectors 15. The connectors 15A and 15B differ in the size of the series inductor; for example the inductance of the connector 15A may be 3.7 $\mu$H and the inductance of the connector 15B may be 22 $\mu$H. It will be understood that the choice of connector 15, 15A, 15B is determined according to the application of the electric motor and the series inductance required. It is thus possible to change the series inductance merely by using a different one of the connectors 15, 15A, 15B.

In most applications a capacitance such as that provided by the capacitor 49 will be required across the power supply to the motor. In some cases, however, the capacitance may not be required or a capacitor may be provided in the region of the switch 4.

Figure 14:
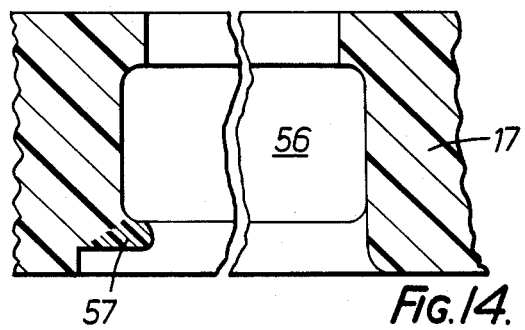
FIGS. 14, 15, 16 and 17 show different methods for locating a bearing in the end cap assembly.
Figure 15:
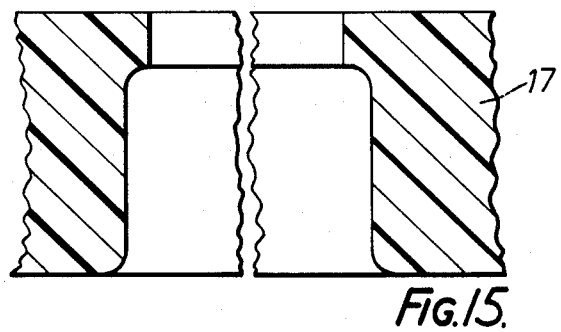
Figure 16:
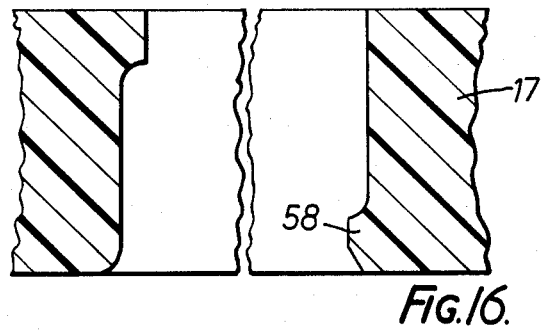

A variety of different techniques may be employed for retaining the bearing 13 in the end portion 17 of the end cap assembly 11. FIG. 14 shows one arrangement in which, after the bearing is inserted into a recess 56 from the inside, the wall of the recess at, for example, four positions around the inner edge thereof is staked over as indicated by reference numeral 57 in FIG. 14. An alternative arrangement illustrated schematically in FIG. 15 is a simple press fit of the bearing 13 in the end portion 17. A further alternative shown in FIG. 16 is to provide a number of projections 58 around the inner edge of the recess, these projections being sized to allow the bearing to be pushed past the projections and snap fitted into the recess.

Figure 17:
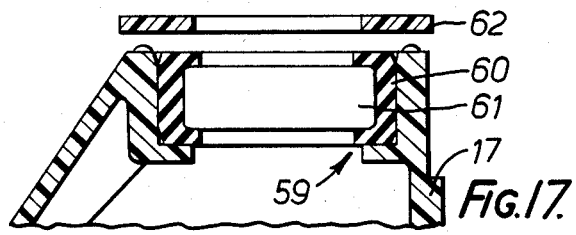

FIG. 17 shows a more complicated arrangement which provides a particularly accurate location of the bearing. In this case the end portion 17 of the assembly 11 is provided with an externally facing recess 59 in which a rubber mounting 60 housing a bearing 61 is located. A retaining ring 62 is secured, for example by ultrasonic welding, to the end portion 17 of the assembly 11 after installation of the mounting 60 and bearing 61 to secure these parts in the recess 59.

Figure 18:
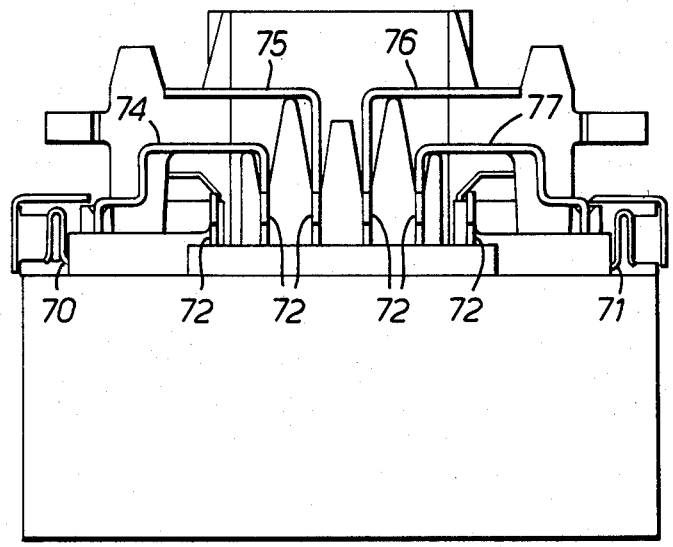
FIG. 18 shows a side view similar to FIG. 2 of a modified form of end cap assembly.
Figure 19:
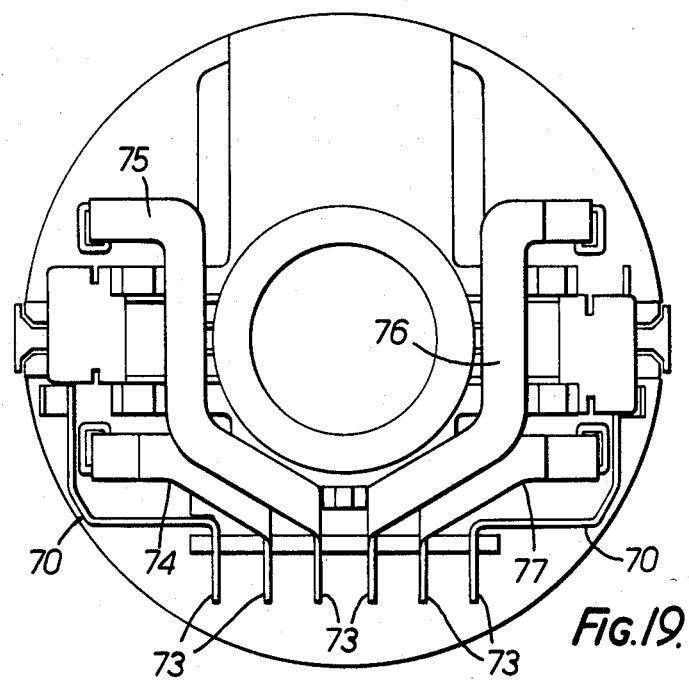
FIG. 19 shows a plan view of the assembly of FIG. 18.
Figure 20:
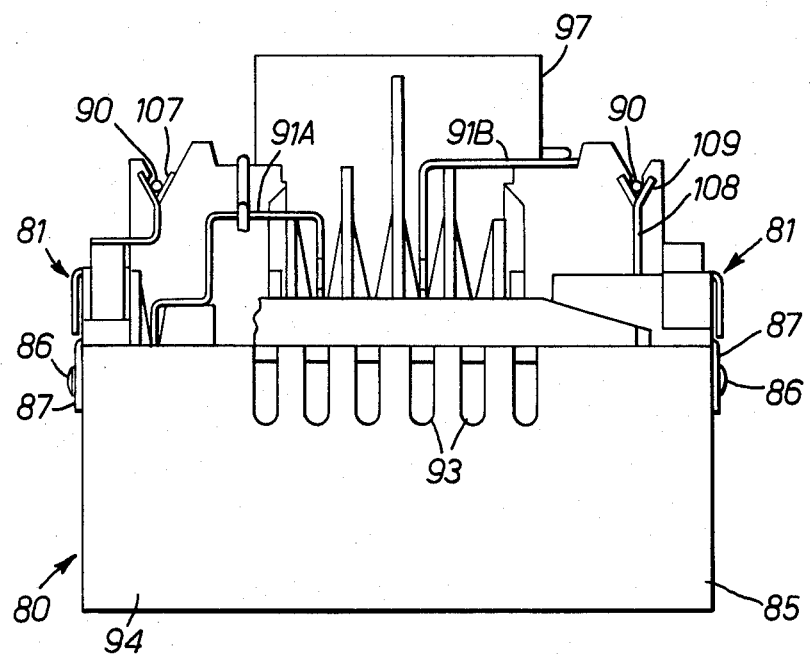
FIG. 20 is a side view of another end cap assembly which is a modification of the assembly shown in FIG. 2.

In certain cases, for example if an electric speed control is to be incorporated, it will be desirable not to connect the brushes directly to the field coil but to provide separate connections to the brushes and the field coils. FIGS. 18 and 19 show arrangements of this kind. Strip connectors 70 and 71 are connected to the brush boxes 14 as before, but instead of the other end of each connector's being connectible to a terminal recess on the stator assembly, it is arranged in a similar way to the limbs 43A, 43B of the previous embodiment and is located in a groove 72 of the plastics body 12 and has an integral projecting terminal 73. Strip connectors 74, 75, 76 and 77 are associated with respective ones of the terminal recesses on the stator assembly 9 and are located on the body 12 in a similar manner to the connectors 16A and 16B of the previous embodiment; thus these connectors are also located in respective grooves 72 and have respective terminals 73. A single plug (not shown) can be connected to the stator unit making electrical connection to each of the terminals 73 and the field coils and brushes can then be electrically connected, externally of the motor, in a circuit in whatever arrangement is desired.

FIGS. 20 to 24 illustrate an end cap assembly 80 which in many respects is similar to the assembly already described but which includes modifications to that assembly. The more important of these modifications will now be described.

Figure 23:
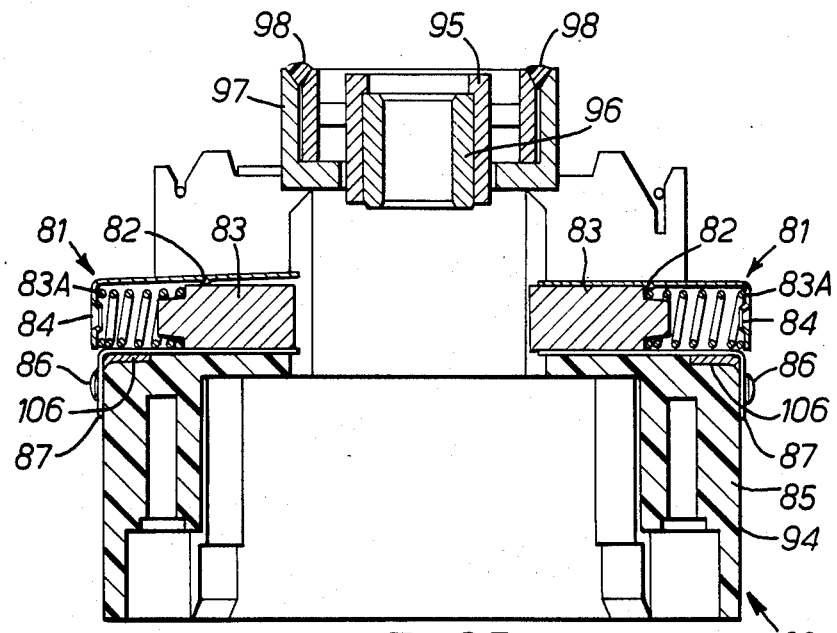
FIG. 23 is a sectional view along the lines A—A in FIG. 22.
Figure 24:
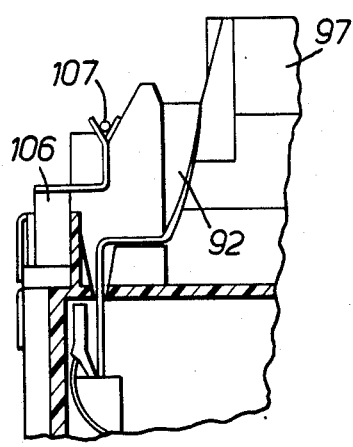
FIG. 24 is a sectional view along the lines C—C in FIG. 22.

The brush boxes 81 of the assembly 80 differ in a number of respects from the previously described assembly. Instead of providing a hooked extension 30 at the front of the box, an inwardly protruding pip is formed at 82 (FIG. 23) in the wall of the brush box and this engages the brush 83 when it is first installed. The pip 82 presses against the brush 83, holding it in position against the bias of a spring 83A, thereby retaining it entirely within the brush box. The left hand side of FIG. 23 shows the brush 83 retained in this way. Once a rotor has been mounted in the assembly 80, the brush 83 is pushed towards the commutator by inserting a tool through a hole 84 in the rear end wall of the brush box. This moves the brush clear of the pip so that it is biased by the spring 83A into contact with a commutator of the rotor. The right hand side of FIG. 24 shows the brush 83 in its forward working position.

Instead of providing the wings 29 to hold the brush boxes in position on the plastics body 85 of the end cap assembly, the rear end of each of the brush boxes 81 is formed with a pair of downturned flanges 87 having holes through which small bosses 86 formed on the body 85 of the assembly project. Once the brush boxes 81 are positioned on the body 85 the bosses 86 are hot staked so as to project over the flanges 87 and retain the boxes permanently on the body 85.

The base of each brush box 81 is of a different shape having lateral flanges 88 mounted in corresponding grooves in the body 85. As most easily seen in FIG. 23, at the rear of the brush box 81 a cavity is formed between the base of the box and the body 85 and an electrical strip connector 106 is located in this cavity prior to insertion of the box. Upon insertion of the box, electrical connection is automatically established between the brush box and the connector 106 with portions of the connector 106 wrapping around the lateral flanges 88 and thereby establishing a very sound connection. Furthermore, as best seen in FIG. 23, the connector is entirely surrounded by the brush box and the plastics body 85 of the end cap assembly and cannot therefore become detached until the box is removed.

Each of the connectors 106, which corresponds to that end of connector 15 that is used to connect to the brush box in the first embodiment, extends upwards from the brush boxes and terminates in a forked end 107. Separate strip connectors 108 are plugged into the field coils in a manner similar to the other ends of connectors 15 of the first embodiment and these connectors similarly terminate in forked ends 109. In order to complete the electrical connection, wires 90 are laid across between the forked ends 107 and 109 and soldered in position. Alternatively, if an inductance is required in the connection, a standard inductor may be connected between the forked ends.

Strip connectors 91A and 91B, corresponding to connectors 16A and 16B of the first embodiment are provided and serve the same purpose as connectors 16A and 16B. The connectors 91A and 91B differ from those of the first embodiment only in details of their shape and the way in which they are mounted on the body 85; for example the connector 91B includes a twisted portion 92 (FIGS. 21, 22 and 24) the end of which plugs into the field coil.

The body 85 of the cap assembly is provided with a number of air vents 93 in its cap part 94.

The end cap assembly 80 is mounted on the stator assembly and thereafter the connectors 106, 108, 91A and 91B are installed in a manner generally similar to the first described embodiment. The actual order of installing the connectors is as follows: first the connector 91A and then the connector 91B are installed; connectors 106 for the brush boxes are installed and thereafter the brush boxes are located (this is different from the first embodiment where the brush boxes are located on the end cap assembly before the connectors 15 are located). Thereafter the connectors 108 are installed, the wires 90 fitted and finally, if it is employed, the capacitor is connected across the connectors 91A and 91B.

It should be understood that this order of installation may be varied according to the specific requirements of any particular design.

FIG. 23 shows the end cap assembly 80 provided with a heat sink 95 in which bearing 96 is mounted. The heat sink 95 is held in place by melting parts of the annular end portion 97 of the bearing at four locations such as 98 around the heat sink. As an alternative technique, the heat sink 75 may be retained by a cover plate in the manner described for the mounting 60 with reference to FIG. 17.

Figure 3:
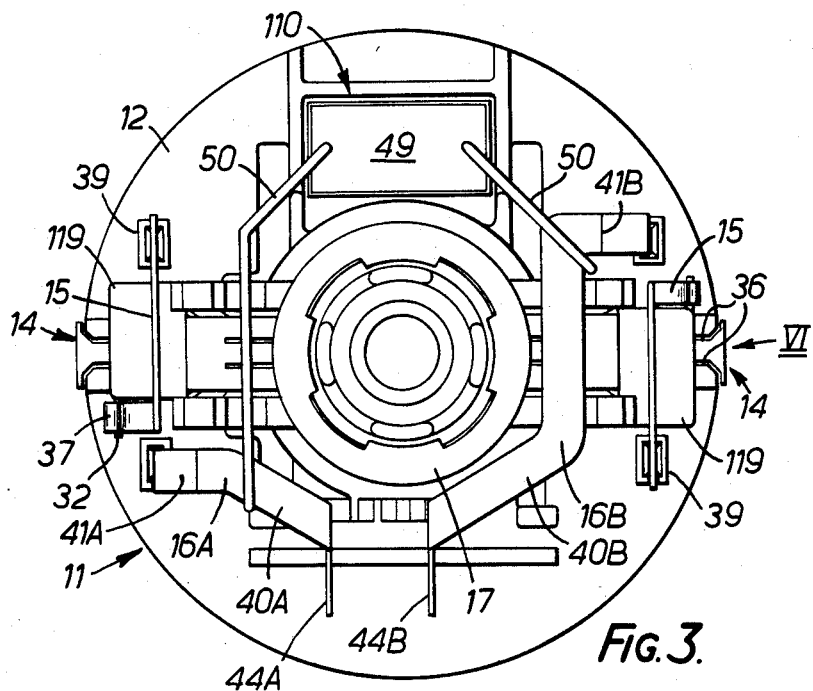
FIG. 3 is a plan view of the end cap assembly.
Figure 4:
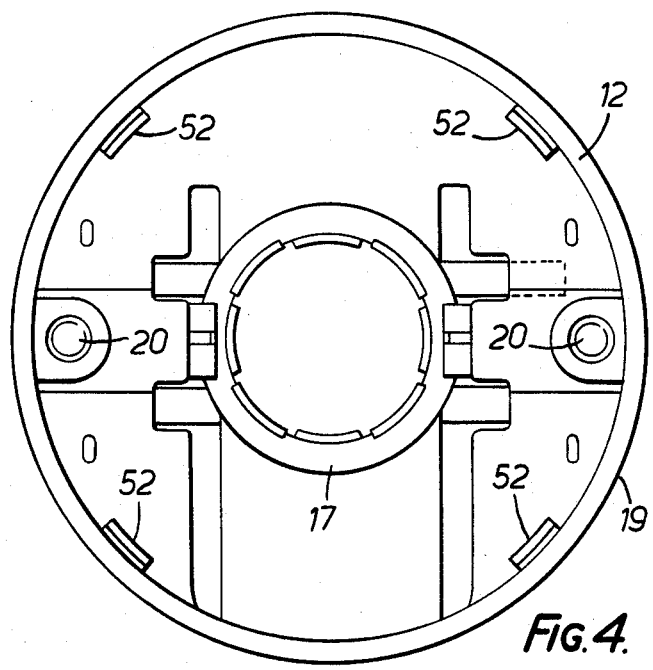
FIG. 4 is an underneath plan view of the end cap assembly.
Figure 21:
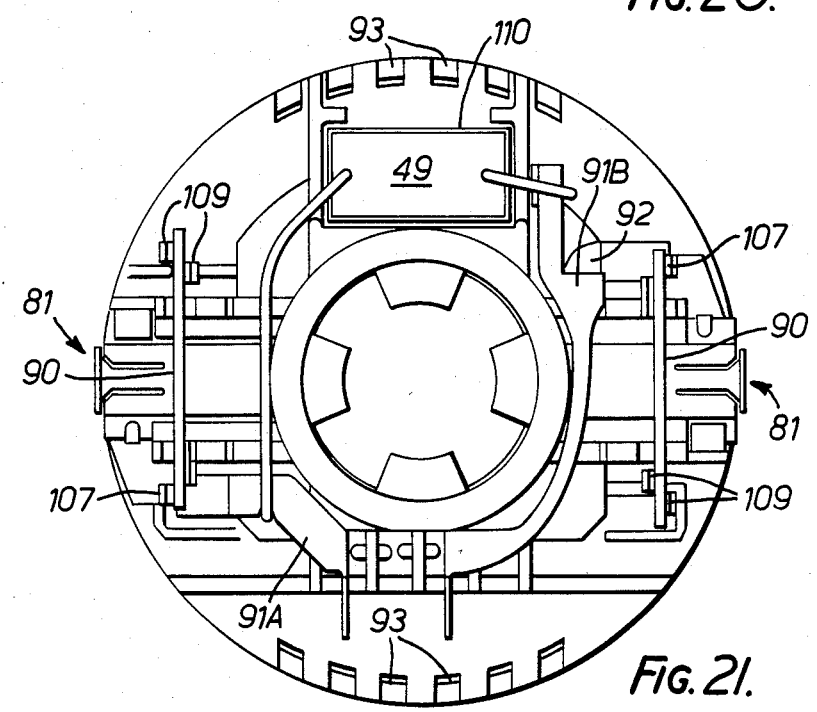
FIG. 21 is plan view of the end cap assembly of FIG. 20.
Figure 22:
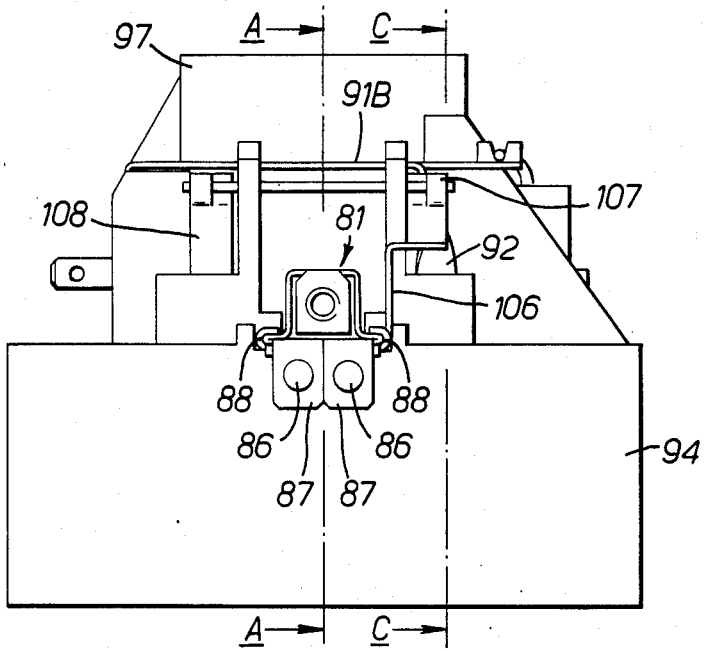
FIG. 22 is a view in the direction of the arrow "B" in FIG. 20.
Figure 25:
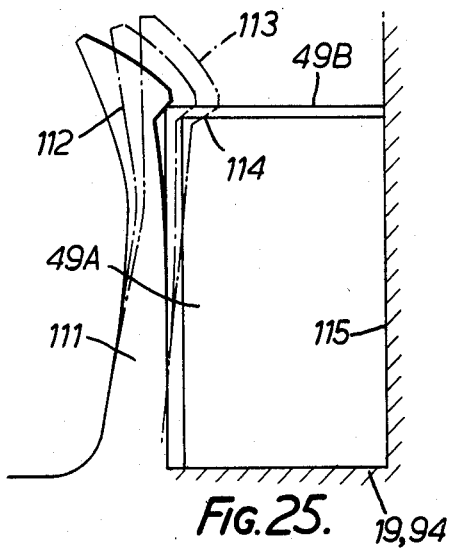
FIG. 25 is a side view of a part of the end cap assembly without electrical connectors showing the use of a resilient arm to locate a capacitor on the motor body.

In the forms of end cap assembly described above the capacitor 49 is located in a recess 110 as can be seen in FIGS. 3 and 4 and in FIG. 21. The form of the recess is slightly different in the two embodiments, but in each case the capacitor is located loosely in an open-ended recess. During use of the motor stresses are created in the spot welded electrical connections of the leads to the capacitor 49 and consequently those connections are liable to break. FIG. 25 illustrates an alternative and novel arrangement for locating the capacitor, which arrangement overcomes these problems in a novel and effective manner.

Referring to FIG. 25, which is a side view of the novel capacitor fastening arrangement, there is shown in that view three positions of the fastening arrangement corresponding to a first position without any capacitor received in the arrangement, a second position with a capacitor 49A of a first relatively small size received in the arrangement and a third position with a capacitor 49B of a second larger size received in the arrangement.

The fastening arrangement is provided on the top of the cylindrical cap part (19 in FIGS. 1 to 13B and 94 in FIGS. 20 to 24) and comprises an upstanding integral plastics arm 111, the natural position of which is the extreme right position shown in FIG. 25, and a wall 115 opposite the arm 111. The arm 111 is formed with a head 112 at its distal end and the head has a steeply inclined cam face 113 and a shallowly inclined shoulder 114 below the face 113. The depth of the arm (that is to say the dimension from left to right in FIG. 25) may be of the order of half the width (that is the dimension into the paper in FIG. 25).

During assembly of the motor, taking the case where for example the capacitor 49A is to be installed, the capacitor 49A is introduced parallel to the armature axis towards the space between the wall 115 and the arm 111. As the capacitor 49A meets the distal end of the arm 111 it engages the cam face 113 thereof camming that end of the arm away from the wall 115 and bending the arm towards a perpendicular position. Once the leading end of the capacitor has passed the head 112 further movement of the arm 111 away from the wall 115 ceases. As the leading end of the capacitor approaches the top of the cylindrical cap part 19, 94 the trailing end passes the most protruding part of the head 112 and the trailing end comes into engagement with the shallowly inclined shoulder 114; at this stage the resilience of the arm causes the arm to spring back towards the wall 115 and the capacitor 49A is pressed down against the top of the cylindrical cap part 19, 94. The final positions of the capacitor 49A and the arm 111 are shown in FIG. 25, the arm 111 being in the middle one of the three positions shown. In this position the arm 111 is still resiliently deformed and the capacitor 49A is clamped securely between the head 112 of the arm on the one hand and the top of the cap part 19, 94 and the wall 115 on the other hand.

If rather than installing the capacitor 49A it is desired to install the capacitor 49B the sequence of operations is the same as that described above except that the final position of the arm 111 is the left hand position shown in FIG. 25.

Because the capacitor is securely clamped on the end cap assembly the risk of the electrical connections to the capacitor becoming damaged are very greatly reduced.

Figure 26:
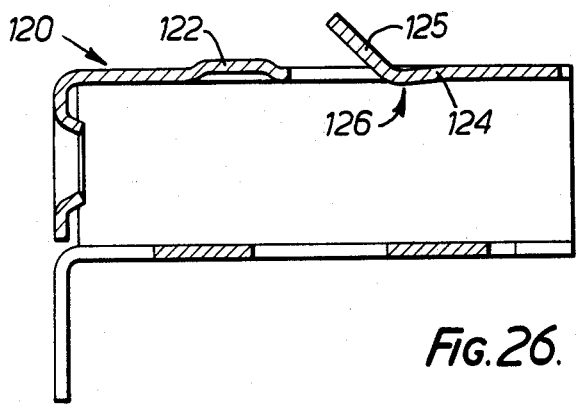
FIG. 26 is a sectional side view along the lines D—D in FIG. 27 of an alternative form of brush box that may be employed in one of the end cap assemblies.
Figure 27:
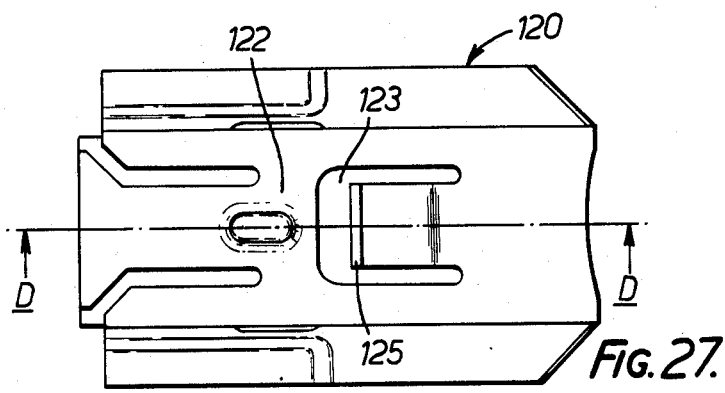
FIG. 27 is a plan view of the alternative form of brush box.

FIGS. 26 and 27 illustrate a modification which may be made to the brush box design to provide a different form of brush retention mechanism. Description of the modified design will be confined to the brush retention mechanism. The brush box 120 shown in FIGS. 26 and 27 has a top wall 122 a tongue portion of which is separated from the remainder on three sides by a slot 123. This tongue portion is bent such that at the root of the tongue there is an inwardly projecting part 124 but the remainder of the tongue is bent outwardly so that its free end defines an outwardly projecting part 125 directed towards the rear end of the brush box and a protuberance 126 is defined between the parts 124 and 125.

A brush (not shown) to be fitted into the brush box 120 is sized to be a close fit in the brush box. Before the brush box is mounted on the end cap assembly, the brush and an associated compression spring are fitted into the brush box through its front end. During this operation the side of the brush becomes wedged between the protuberance 126 and the bottom wall of the brush box, and the brush is thereby held entirely within the brush box against the resilient bias of the compression spring.

The brush box is fitted to the end cap assembly in this state and after the end cap assembly has been installed on the armature shaft, a tool is introduced radially inwardly immediately above the top wall 122 of the brush box. This tool engages the outwardly projecting part 125 of the tongue portion and thereby pushes that part outwards. The tongue portion is thus permanently deformed outwardly such that the part 124 becomes approximately flush with the top wall 122 of the brush box. The brush is thereby released and thereafter remains free to slide into and out of the brush box.

It will be seen that this brush retention method has several advantages. While the brush can be securely retained in the brush box prior to assembly of the armature, once it is released there is no longer any impediment to free sliding of the brush in the box. Furthermore the arrangement for releasing the mechanism involving the radial insertion and withdrawal of a tool is particularly suitable for automatic machinery.

The description above is concerned primarily with the structure of the end cap assembly. It should be understood that the nature of the end cap 10 can be altered according to the circumstances; for example, if a complete motor unit in the form of a single module is required, the end cap 10 may incorporate a bearing for the armature shaft and the armature may be installed at the same time as the end cap 10, stator assembly 9 and end cap assembly 11 are secured, thereby providing a modular motor.

While in the described embodiments, the electrical connectors are added after the end cap assembly is fixed to the stator assembly it is within the scope of the invention to add the connectors (and brush boxes) to the end cap assembly before the latter is fixed to the stator assembly.

What is claimed is:

1. An end cap assembly for mounting on a lamination stack of an electric motor having a motor axis, said end cap assembly comprising:
    a plastics body;
    a pair of brush boxes made of electrically conducting material, mounted on the plastics body and housing brushes resiliently biased in a direction towards the motor axis for making contact with a rotor of the motor;
    the brush boxes including releasable fastenings for retaining the brushes in a retracted position in the brush boxes;
    a plurality of electrical conductors in the form of strips of predetermined configuration located in the plastics body for making electrical connections between components of the motor, each of the brush boxes making contact with a respective electrical conductor;
    each electrical conductor making contact with a brush box being configured to wrap around the base of the brush box;
    the base of each brush box having lateral flanges around which the respective electrical conductor is configured to wrap; and
    the lateral flanges being formed as lateral extensions of the base of the brush box and the conductor passing underneath and directly adjacent to the base of the brush box.

2. An end cap assembly for mounting on a lamination stack of an electric motor having a motor axis, said end cap assembly comprising:
    a plastics body;
    a pair of brush boxes made of electrically conducting material, mounted on the plastics body and housing brushes resiliently biased in a direction towards the motor axis for making contact with a rotor of the motor;
    the brush boxes including releasable fastenings for retaining the brushes in a retracted position in the brush boxes;
    a plurality of electrical conductors in the form of strips of predetermined configuration located in the plastics body for making electrical connections between components of the motor, each of the brush boxes making contact with a respective electrical conductor;
    each electrical conductor making contact with a brush box being configured to wrap around the base of the brush box;
    the arrangement of each brush box and the respective electrical conducor being such that the respective electrical conductor cannot be moved out of engagement with the brush box without moving the brush box.

3. An end cap assembly as claimed in claim 2, wherein the brush box is permanently fixed to the plastics body.

4. An end cap assembly for mounting on a lamination stack of an electric motor having a motor axis, said end cap assembly comprising:
    a plastics body, a pair of brush boxes made of electrically conducting material, mounted on the plastics body and housing brushes resiliently biased in a direction towards the motor axis for making contact with a rotor of the motor;
    the brush boxes including releasable fastenings for retaining the brushes in a retracted position in the brush boxes;
    a plurality of electrical conductors in the form of strips of predetermined configuration located in the plastics body for making electrical connections between components of the motor, each of the brush boxes making contact with a respective electrical conductor; and
    each brush box being made of sheet material and including side walls, an end wall, and an opening opposite the end wall and the end wall being connected to one of the side walls by a tongue of sheet material and being movable from a closed position in which it obstructs the associated end of the brush box to an open position in which the obstruction is substantially removed to enable a brush to be inserted or removed, movement of the end wall being accompanied by deformation of the tongue.

5. An end cap assembly as claimed in claim 4, wherein the tongue has a length of at least one sixth of the length of the brush box.

6. An end cap assembly as claimed in claim 4, wherein the tongue is formed from a part of the side wall to which the end wall is joined.

7. An end cap assembly as claimed in claim 4 further including an electrical impedance mounted on the plastics body and to which electrical connection is made, wherein the plastics body includes a resilient plastics clamping arm which is resiliently deformed by the electrical impedance and which bears against the impedance clamping it to the body.

8. An end cap assembly as claimed in claim 7 in which the clamping arm has a distal end on which a clamping head is formed, the clamping head having a protuberance for engaging the impedance.

9. An end cap assembly as claimed in claim 8 in which the protuberance has an inclined cam face for engaging the impedance during its installation whereby the clamping arm is resiliently deformed during said installation.

10. An end cap assembly as claimed in claim 8 in which the protuberance has a face disposed at an acute angle to the longitudinal axis of the arm, which face bears against the impedance clamping it to the body.

11. A brush box made of sheet material and comprising:

side walls, an end wall and an opening opposite the end wall;

the end wall being connected to one of the side walls by a tongue of sheet material, said tongue forming part of said one side wall;

said end wall being movable relative to said one side wall from a closed position in which said end wall obstructs an associated end of the brush box to an open position in which said associated end is unobstructed by said end wall whereby a brush can be inserted into or removed from said brush box through said associated end; and said tongue being deformable to enable movement of said end wall between said closed and open positions to be accomplished.

* * * * *